United States Patent [19]

Henry

[11] Patent Number: 4,598,582
[45] Date of Patent: Jul. 8, 1986

[54] BANK AND PITCH INDICATOR

[76] Inventor: Richard D. Henry, Hookstown Grade Rd. R.D. #1 Box 331-A, Clinton, Pa. 15026

[21] Appl. No.: 629,850

[22] Filed: Jul. 11, 1984

[51] Int. Cl.$^4$ ............................................. G01C 21/00
[52] U.S. Cl. .................................................. 73/178 R
[58] Field of Search ............ 73/178 R, 178 T, 178 H, 73/180, 181, 182; 33/318, 328, 329, 330

[56] References Cited

U.S. PATENT DOCUMENTS

| | | | |
|---|---|---|---|
| 1,579,670 | 4/1926 | Sperry | 73/180 |
| 2,197,890 | 4/1940 | Koster | 73/180 |
| 2,943,482 | 7/1960 | Fritze et al. | 73/178 R |
| 3,162,834 | 12/1964 | Schweighofer | 73/178 R |
| 3,338,096 | 8/1967 | Katz | 73/178 R |
| 3,355,943 | 12/1967 | Mills et al. | 73/178 R |
| 3,357,242 | 12/1967 | Bonnell et al. | 73/178 R |

Primary Examiner—Donald O. Woodiel

[57] ABSTRACT

A gyro flight instrument utilizing variable rate inputs, such variable being proportional to the speed of the craft, the result of which will be a lateral display nearly corresponding to the true lateral reference. Such lateral display will be in combination with a pitch display, such display will be variable in proportion to the angle of attack of the craft in relation to the relative airstream. The resultant display will nearly match the display of a gyro horizon with the exception of extreme excursions of pitch and bank. This will result in a highly trustworthy instrument the indication of which is totally derived from basic, non-tumbling reference, totally immune of earth reference requirement.

11 Claims, 5 Drawing Figures

BANK AND PITCH INDICATOR

BACKGROUND OF THE INVENTION

When weather conditions obscure the natural horizon, the flight of an aircraft is totally dependent upon its instrumentation to guarantee safe flight. In years past, the basic instrumentation was considered the mainstay, contrary to this, the gyro horizon was considered the helpmate. With time and evolution, the exact opposite now holds true, even though it is far less trustworthy. Due to being more difficult, basic instrument flying has been pushed aside in favor of attitude instrument flying due to its ease of accomplishment. Ease of accomplishment quite naturally would make flying far safer if it were not for the fact the gyro horizon indications are totally dependent upon earth reference requirement. Earth reference indication is achieved by erection of the gyro into the gravitational tug force of the earth, but BEWARE: little gremlins are numerous. False tug forces abound due to lateral and longitudinal acceleration and deacceleration. False tug forces also arise during turns due to centrifugal force. Erection must be discontinued during false tug force encounter so as to avoid erroneous erection. Erroneous erection will also occur due to numerous cause and circumstance such as but not limited to, precessional drift, coriolis drift, earth rotational drift, bearing friction drift, gimbal error drift, error translation drift etc. Errors at times are in opposition to one another and tend to cancel one another out but BEWARE: at times errors will be in unison with one another, therefore compounding the error of indication. Earth reference gyros are also plagued by an occasional gimbal lock wherein the spin axis of the gyro becomes coincident or in alignment with the pivots of the gimbal cage wherein the gyro will tumble. This new invention will provide the pilot with the best of both worlds, ease of use plus trustworthiness due to the fact that it is free of drift, free of tumble and free of earth reference requirement.

DRAWINGS

FIG. 1 portrays the essential components of the invention along with essential components of possible variations. The main section of the display indicates a combination of a basic gyro combined with a mechanical interface for the control of variable rate and another mechanical interface for the control of an aircraft silhouette to provide angle of attack indication.

FIG. 1A is a side view of the gyro display face disk which given indication to the pilot of his lateral leveling situation.

FIG. 2 portrays electrical interface (Autosyn or Selsyn) control of variable rate and pitch (angle of attack) systems.

FIG. 3 portrays Selsyn system circuitry.

FIG. 4 portrays Autosyn system circuitry.

DETAILED DESCRIPTION OF THE INVENTION

Referring to FIG. 1, a basic rate gyro 1 with its normal display face, reversing system and turn needle removed. Disposed to its left is an exploded view of the new display face 5, which upon assembly will move in the direction of arrows 40, whereby, control pin 3 will engage bushing 4. Display face 5 will now rotate in unison with the gyro gimbal cage, such rotation portrayed by arrows 50. Aircraft silhouette 6 upon assembly will move in the direction of arrows 41 and will nearly but not quite touch display face 5. Silhouette 6 will be responsive to and move vertically up and down in unison with and proportional to angle of attack vane 13. Vane 13 is responsive to the relative airstream, such response is passed thru bushing at 23 on mounting plate 12, transmitting its rotating motion thru flexible shaft 10, thru bushing 11, such rotating motion will cause control fork 9 to actuate in a motion portrayed by arrows 60. The motion of fork 9 will cause actuator shaft 7 to respond up or down thru guide tube 8, the result of which will be for silhouette 6 to follow motion 60. It is obvious that silhouette 6 will respond to angle of attack vane 13, therefore silhouette 6 will show the angle of attack of the aircraft with relation to the relative airstream. This angle of attack will be obvious to the pilot as portrayed, on, above or below line 70 on display face 5. NOTE: Conduit for flexible shaft 10 is not shown. Additional vertical guides for silhouette 6 are also not shown. Directly above gyro 1 is another innovation wherein Air Paddle 14 will be responsive to the relative airstream and proportional to the speed of the craft. Such response will be transmitted by shaft 15 thru bushing 16 on mounting plate 17. Lever arm 18 will attach to and move in unison with shaft 15. Movement of lever arm 18 will cause a linear movement of flexible shaft 20 thru its respective conduit. NOTE: Conduit not shown.

The flexible shaft will enter gyro at position 22, the linear movement of which will cause the tension of the gyro sensitivity spring 2 to change proportional to the movement of air paddle 14. NOTE: Air Paddle balance spring 19 will have adjustable tension, not shown and likewise for the gyro gimbal cage sensitivity spring. It now becomes obvious that the deflection of the gyro gimbal cage will be variable in relation to airspeed, wherein as the speed increases the sensitivity spring tension decreases, which will result in an increase of gimbal cage deflection for a given rate of turn. If the speed should decrease, the exact opposite will transpire. By fine tuning of the tension of springs 19 and 2, it now becomes obvious that lateral display line 70 will proportionally respond and thru adjustment can be made to nearly match the true horizon during all turns up to but not exceeding 45 degrees of bank. At 45 degrees the gyro will hit its limit stops, past which it will not respond. It is to be understood that many innovations common to the state of the art will not be shown. Such innovations will include but not limited to, means to amplify linear movement, means to reverse linear movement, means to amplify rotational movement, and means to reverse rotational movement. Also included will be numerous means of achieving non-linearity if so desired, all common to the state of the art. Likewise the juncture point of flexiable shaft 20 to lever arm 18 may be made variable so as to achieve a lesser or greater amount of throw thereby changing the amount of linear movement of flexible shaft 20. Linear movement may be converted to rotating movement or vice-versa by means such as lever arms and appended shafts. Some examples of these will become apparent in FIG. 2.

Referring to FIG. 1, a circular disk 5, blue 5a on top, black 5b on the bottom, demarcation line 70 and it will be understood but not shown that the circular disk will also display 5, 10, 15 and 20 degree angle of attack lines, common to the state of the art. Disk 5 will be free to centrally rotate, FIG. 1A, in a bushing at the center of horizontal suspension bar 36, the horizontal outer limits of such bar will attach to the outer circumference if the gyro case. Disk 5 will be retained by circlip 37 and also provides raised bushing 4, for engagement with control pin 3. Referring to FIG. 1, we will remove and discard flexible shafts 20 and 10. Referring to FIG. 2, we will substitute electrical systems to replace the discarded flexible shafts. By use of Autosyn or Selsyn controls we can replace mechanical systems. Air Paddle shaft 15 will couple to and turn Autosyn shaft 31. The Autosyn transmitter 29 will in turn, send a proportional electrical signal thru wiring bundle 33 to its respective Autosyn receiver 30. Autosyn shaft 32 will obviously rotate in direct relation to and in exact proportion to shaft 31. NOTE: Autosyn transmitter and receiver case mountings are not shown. Likewise, shaft support saddle bearings for the support of shaft 32 are also not shown. It is now obvious that clamp 45 will rotate in response to the rotation of shaft 32 and arm 42 will likewise respond as it is attached to clamp 45. Lever arm 42 will move control rod 43 thereby controlling the spring tension of the gimbal cage sensitivity spring 2. Obviously gimbal cage sensitivity is directly proportional to Air Paddle 14 movement, therefore proportional to the speed of the aircraft. The end of sensitivity spring 2 attaches to gyro control plate 46, plate 46 attaches to the end of the gyro gimbal cage frame, therefore, rotational sensitivity of control plate 46 and gimbal cage frame thereto attached will be directly proportional to the tension of sensitivity spring 2. Control pin 3 is attached to plate 46 and will respond accordingly. NOTE: Gimbal cage frame not shown.

Referring to the bottom of FIG. 2, one will see that silhouette angle of attack presentation is likewise electrically controlled. The angle of attack vane 13' has a shaft that passes thru mounting plate 12' at its bushing at location 23'. The shaft of vane 13' will couple to Autosyn shaft 31', both shafts being hidden from sight. Autosyn 29' will end its electrical signal thru its respective wire bundle 33' to the Autosyn receiver 30'. Control fork 9 will clamp securely to shaft 32' (hidden from view) of its respective Autosyn receiver 30'. Obviously Autosyn 29' will be responsive to vane 13', likewise Autosyn receiver 30' will be responsive to Autosyn transmitter 29'. Obviously control fork 9 will move in unison with and proportional to vane 13+, therefore silhouette 6 will obviously do likewise. It will be understood that Selsyn controls may be substituted in place of Autosyn controls. Electrical power will feed the wire bundle 33' at feed wires 34' and 35'. Referring back to the top of FIG. 2, from the power source, electrical power will feed thru feed wires 34 and 35 to feed wire bundle 33 thereby supplying power to its respective Autosyns.

OPERATION

Figure 1:
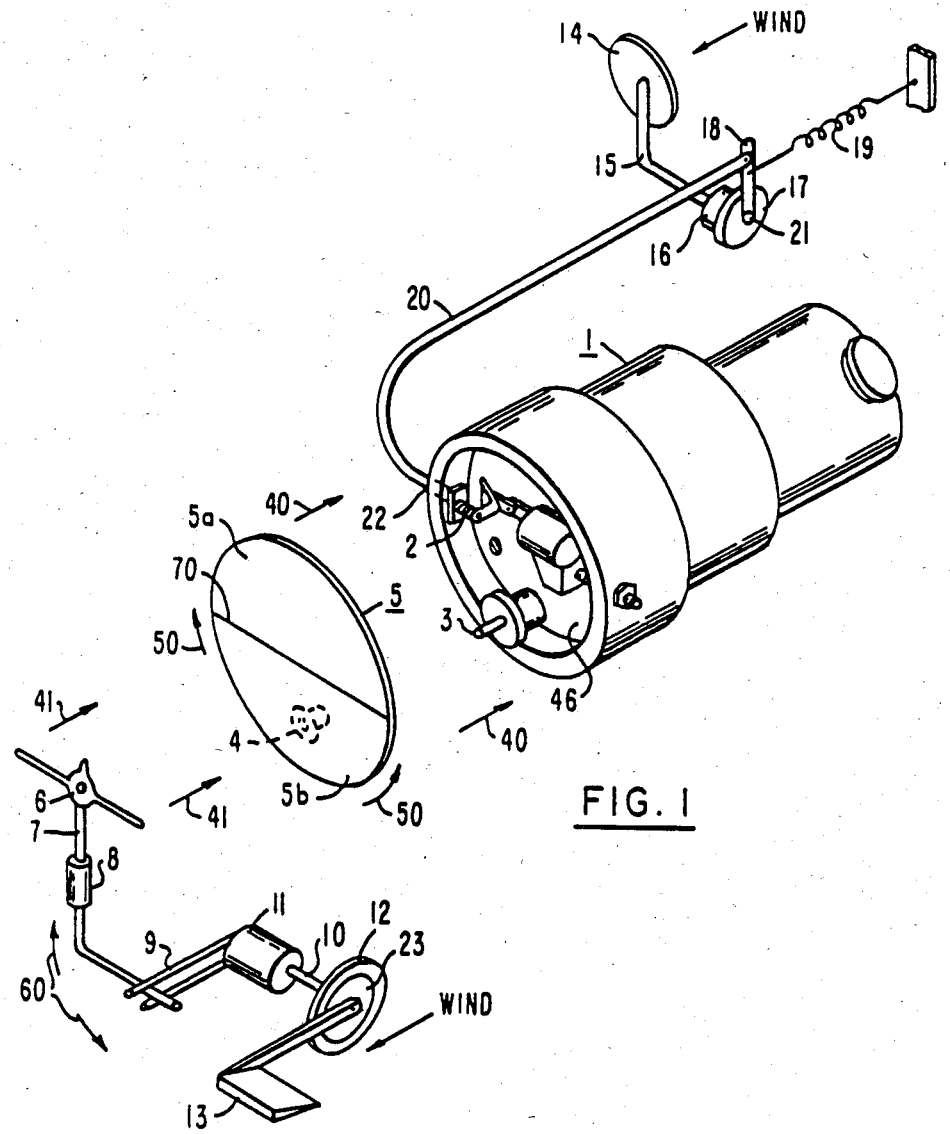
Figure 1A:
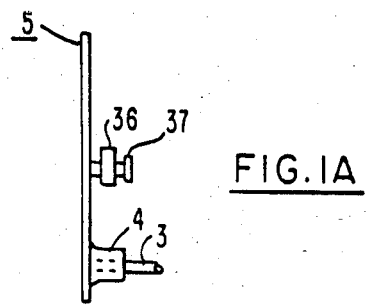

THE RATE GYRO is blessed with the most trustworthy erection system of any spinning gyro. It also has the most perfect correction system, wherein its erection system instantly removes (corrects) all induced errors. Rate gyros, rate detectors and rate sensors are the only instruments that are immune of drift and immune of tumble. Only the Ring Laser Gyro, the Flex Gyro and or the Piezoelectric Gyro can match the performance of the old time proven rate gyro, because they, likewise are rate detectors. Earth reference gyros cannot even come close as they are plagued by numerous problems. For the predescribed reasons the rate gyro has been selected as the backbone of this new gyro system. The rate gyro on the other hand has always been plagued with one major drawback, that being its difficulty of use due to its presentation. This new invention will eliminate this major drawback. In use this instrument will respond in a similar manner as that of the gyro horizon. This is how: Flight Situation Disc 5 will be responsive to rate input sensed by gyro assembly 1. During turns control pin 3 will cause disc 5 to rotate in unison with the roll of the gyros gimbal cage. Due to the removal of the normal reversing system, demarcation line 70 will laterally rotate directionally with the natural horizon but will do so in a manner that will lead or lag the true natural reference should the pilot deviate above or below the optimum design reference speed. By incorporation of air paddle 14 we can vary the tension of sensitivity spring 2, whereby, the rate output to pin 3 will vary proportionally to the speed of the aircraft. Obviously the lead or lag of demarcation line 70 can be reduced to an infinitesimal amount. By proper selection of components and or adjustment thereof, the output will nearly match the true natural horizon reference.

Figure 2:
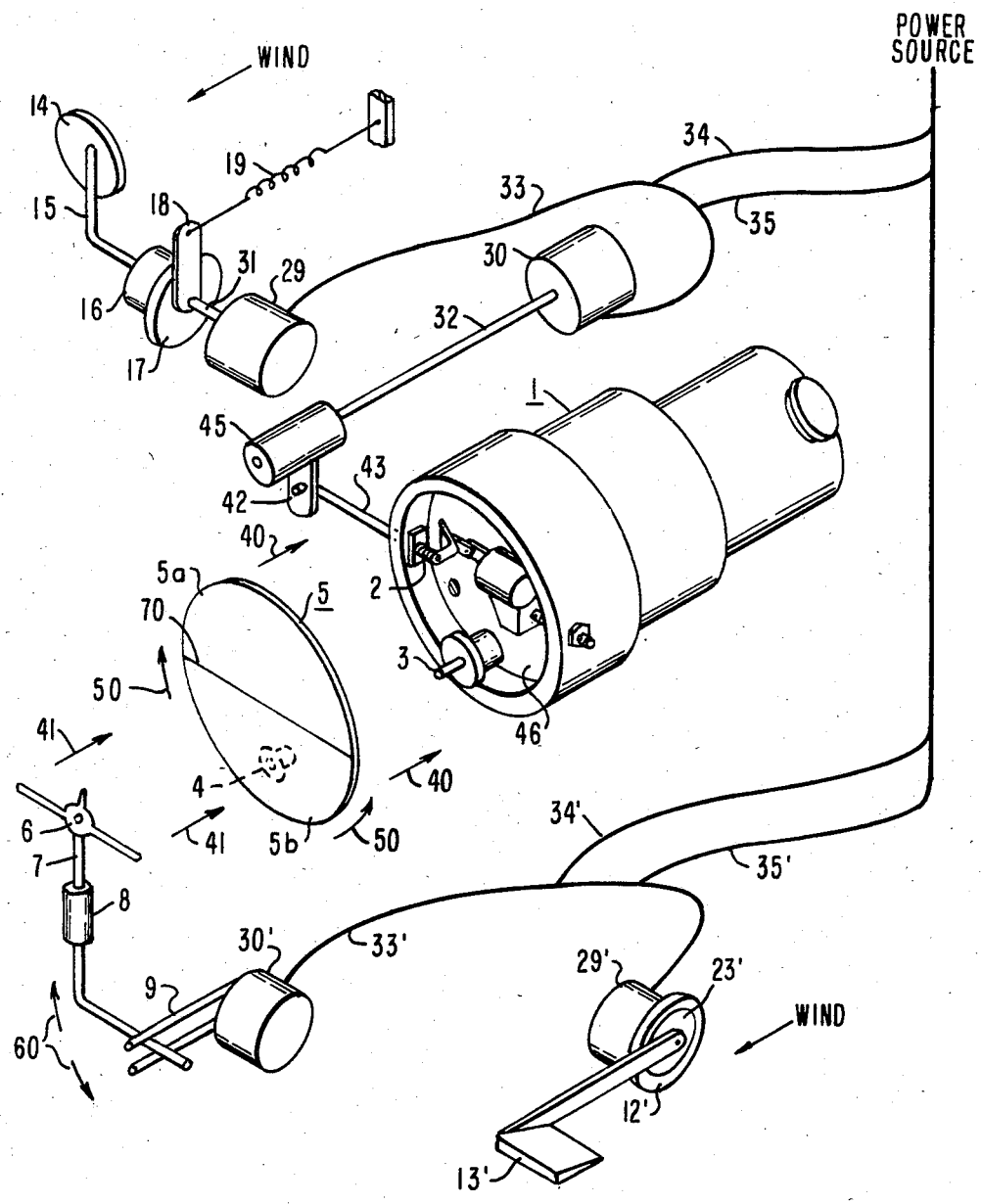
Figure 3:
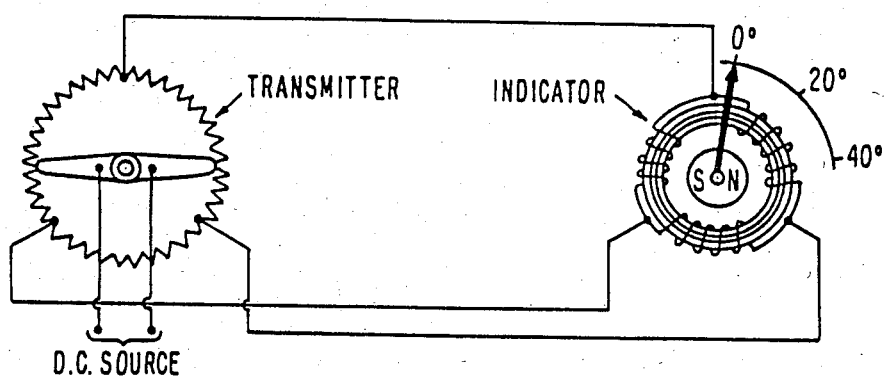
FIG. 3 is a wiring diagram for a typical Selsyn system.
Figure 4:
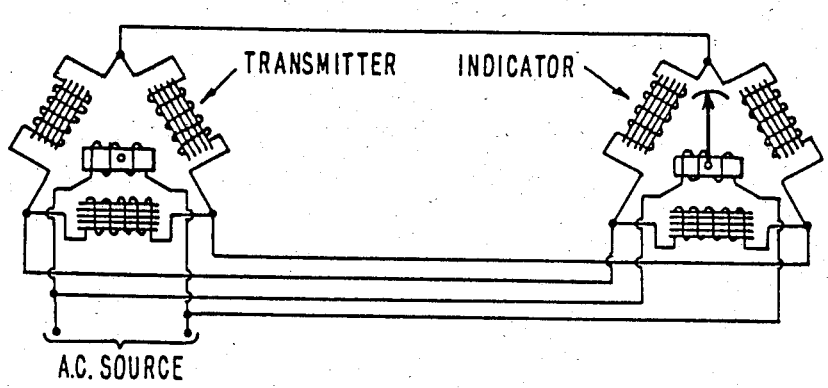
FIG. 4 is a wiring diagram for a typical Autosyn system.

To understand the reasoning behind this system one must try to understand the problem. The main problem is as follows: For a given rate of turn (example, standard rate) at high speeds this rate will require extreme bank angles, conversely at very low speeds this rate will require very shallow bank angles. Bank angles will only be normal at intermediate optimum speeds. This is due to the difference of the circumference of the arc being circumscribed. This new invention, the speed compensated gyro as portrayed in FIG. 1 eliminates the deficiencies of the normal rate gyro. FIG. 1 also portrays aircraft silhouette 6 to move up and down in unison with angle of attack vane 13, such movement to display above or below demarcation line 70 of Flight Situation Disc 5. FIG. 1 also portrays mechanical interconnect interface of components. FIG. 2 portrays electrical interconnect interface of components. For greater detail of operation, refer to DETAILED DESCRIPTION OF THE INVENTION.

FIG. 2 is very similar to FIG. 1 with the exception that in operation Autosyn or Selsyn controls are used in lieu of flexible shafts, thus providing more versatile installation. Autosyn and Selsyn systems have one major drawback, wherein they are totally dependent on an electrical power source, therefore do not provide the degree of redundancy as does their counterpart the flexible shafts.

What I claim:

1. An aircraft instrument for indicating the roll and pitch of an aircraft comprising a rotatable disk having a face portraying sky above a demarcation line and earth below, a rate gyro responsive to roll of the aircraft connected to the disk effecting rotation thereof to position the demarcation line in a manner indicative of a roll condition of the aircraft, an air paddle responsive to the relative airstream connect to move a gimbal cage of the rate gyro to compensate for variations in the roll sensitivity of the rate gyro due to changes in airspeed, a rear view aircraft silhouette positioned in front of the disk for relative vertical movement with respect to the demarcation line on the disk, an angle of attack vane responsive to the relative airstream connected to move the silhouette to indicate the pitch of the aircraft.

2. An aircraft instrument according to claim 1 including an aircraft rear view silhouette additionally comprising of apparatus, wherein, vertical movement of the silhouette above or below the demarcation line will be responsive to movement of an angle of attack vane by means of a flexible shaft, a control fork and a moveable stanchion serially connected or engaged, whereby, vane movement will impart rotational movement to a flexible shaft, said shaft rotating within a flexible conduit, said shaft will transmit its rotation to a control fork, whereby, the silhouette and its moveable stanchion will be responsive to said control fork movement.

3. In accordance to claim 2, rear view silhouette will be responsive to linear movement of its support stanchion actuator shaft, said shaft movement being thru its respective guide tube, wherein a hook on the end of said shaft will engage a control fork and be responsive thereto, said fork rotating in unison with and proportionally to an angle of attack vane by means of a flexible shaft therewith serially interconnected.

4. An aircraft instrument according to claim 1 including an aircraft rear view silhouette additionally comprising of apparatus, wherein, movement of the silhouette above or below the demarcation line will be responsive to movement of an angle of attack vane, said response by means of an autosyn or selsyn transmitter, connective wiring, autosyn or selsyn receiver, control fork, moveable support stanchion and silhoutte thereto attached, wherein, vane movement will impart a proportional rotation of the transmitter shaft and by means of connective electrical wiring, the receiver shaft will move rotationally in accordance to and proportionally with the transmitter shaft, thereby the control fork being fixably attached to the receiver shaft by engagement with the silhoutte mounting stanchion, will cause stanchion to move in response thereto, whereby, silhoutte thereto attached will display proportional pitch information above or below the demarcation line.

5. In accordance with claim 4, the rear view silhouette will be responsive to linear movement of its support stanchion actuator shaft, said shaft movement being thru and within its respective guide tube, wherein a hook on the end of said shaft will engage a control fork, said fork being rotationally responsive to an autosyn or selsyn receiver, said servo receiver being responsive to an autosyn or selsyn transmitter by means of connective wiring, wherein said servo transmitter shaft will be connectable to an angle of attack vane and responsive thereto, whereby the silhouette presentation of the bank and pitch indicator will move in unison with and proportionally to movement of the angle of attack vane, wherein should the pilot change the angle of attack of the aircraft, the silhoutte will portray said change by reference to the horizon demarcation line, sky blue above, black earth below said demarcation line.

6. In accordance with claim 1, apparatus wherein the deflective response of the rate gyro is inversely proportional to the spring tension of its erection spring, said spring tension being inversely proportional to changes of airspeed, wherein the tension of the erection spring will be responsive to air paddle movement, said air paddle located within the relative airstream therefore said air paddle response being proportional to changes of airspeed, therefore should the speed of the craft increase the deflective sensitivity of the gyro will likewise increase, contrary to this, should the airspeed decrease, the deflective sensitivity of the gyro will likewise decrease in response thereto.

7. In accordance with claim 6, apparatus for the interconnect of the air paddle to the erection spring will be by means of a flexible shaft, said shaft being routed within a flexible conduit or sheath, wherein should the speed of the aircraft increase the air paddle will move in response thereto, thereby transmitting said response to the erection spring by means of the flexible shaft, said spring tension will decrease in response thereto, contrary to this the exact opposite will occur should the speed of the aircraft decrease, the air paddle will move in response thereto, thereby transmitting said response to the erection spring by means of the flexible shaft, said spring tension will increase in response thereto.

8. In accordance with claim 6, apparatus for the interconnect of the air paddle to the erection spring will be by means of autosyn or selsyn servo transmitters thru electrical wiring interconnect to their respective autosyn or selsyn receivers, wherein should the speed of the aircraft increase the air paddle will move in response thereto, thereby transmitting said response to the erection spring by means of a servo transmitter either autosyn or selsyn, thru connective wiring to a servo receiver either autosyn or selsyn, said servo receiver will cause the erection spring tension to decrease in response thereto, contrary to this the exact opposite will occur should the speed of the aircraft decrease, the servo transmitter will by means of connective wiring cause the servo receiver to move in response thereto, the result of which will be an increase in the tension of the erection spring.

9. In accordance with claim 1, the aircraft instrument may drive gyro rotor spin power from either an air driven or an electrical source.

10. An aircraft instrument in accordance with claim 1, which is highly trustworthy due to basic non drifting, non tumbling derivitive and will remain trustworthy irrespective of adverse flight maneuvers such as spins, rolls loops or any combination thereof.

11. In accordance with claim 1, apparatus to provide the pilot of an aircraft with angle of attack information directly displayed upon the face of a basic gyro, said basic gyro to display roll information in combination therewith.

* * * * *